(No Model.)
J. KELLY.
FLUSHING APPARATUS FOR WATER CLOSETS.
No. 441,799. Patented Dec. 2, 1890.
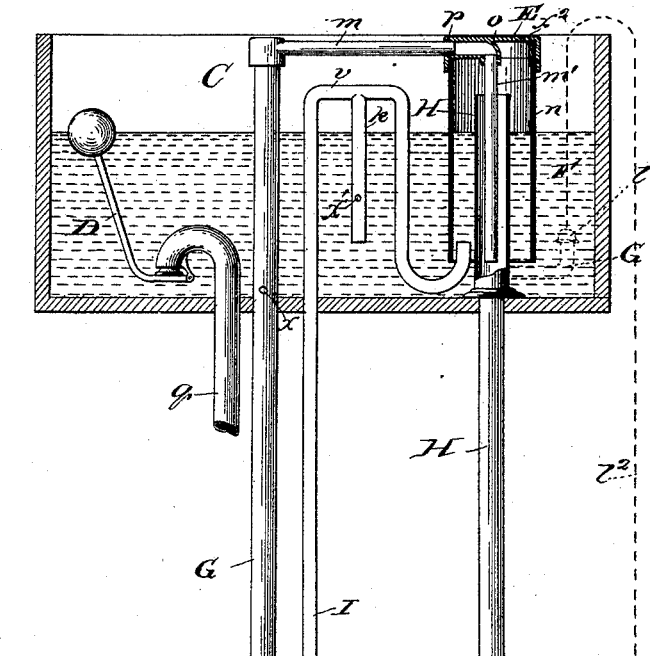
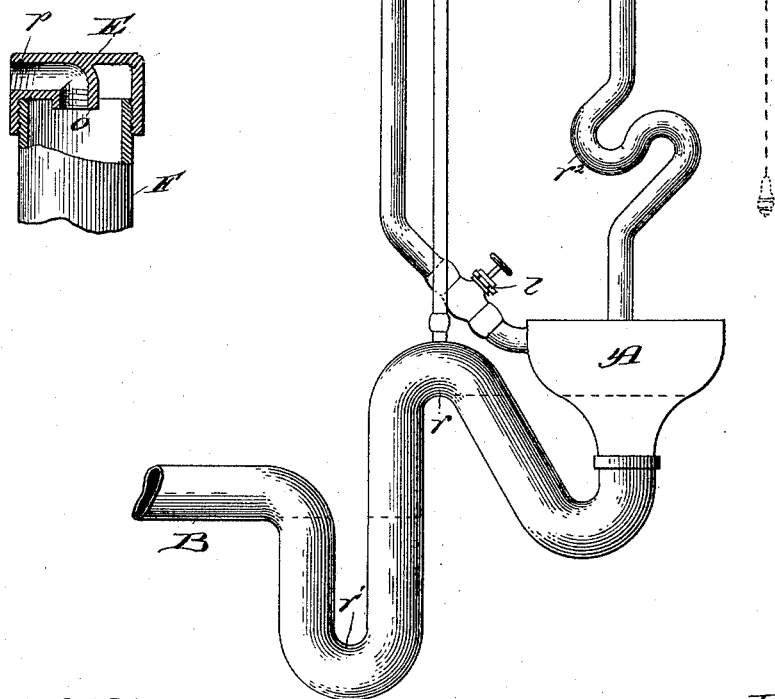
Witnesses:
Inventor:
John Kelly,
By Dyrenforth & Dyrenforth,
Attys.

UNITED STATES PATENT OFFICE

JOHN KELLY, OF CHICAGO, ILLINOIS, ASSIGNOR OF ONE-HALF TO JAMES KELLY, OF SAME PLACE.

FLUSHING APPARATUS FOR WATER-CLOSETS.

SPECIFICATION forming part of Letters Patent No. 441,799, dated December 2, 1890.

Application filed August 19, 1890. Serial No. 362,380. (No model.)

*To all whom it may concern:*

Be it known that I, JOHN KELLY, a citizen of the United States, residing at Chicago, in the county of Cook and State of Illinois, have invented a new and useful Improvement in Water-Closet-Flushing Apparatus, of which the following is a specification.

My invention is in the nature of an improvement upon the construction of apparatus set forth in Letters Patent of the United States No. 415,869, granted to me on the 26th day of November, 1889, for an apparatus designed for the same purpose as that forming the subject of the present application.
The operation of my aforesaid formerly patented device is, generally stated, to maintain normally a supply of water in the bowl and traps between the latter and outlet-pipe by the normal air-bound condition of the traps, and to withdraw the air from the traps in flushing to permit free discharge from the bowl. This is effected through the media of an air-pipe leading from the higher of the two traps into the overhead water-supply tank and terminating in a trap in the tank, a trapped flushing-pipe leading from the trap in the tank into the bowl, and a valve-controlled pipe leading out of the tank from the air-pipe inside it, and therein provided with an aperture below the water-line. By opening the valve the water contained in the pipe it controls, and which enters the pipe through its aperture referred to inside the tank, discharges, drawing after it through the air-pipe the air from the waste-pipe trap, and also drawing from the trap in the tank the air it contains, thereby relieving the first-named trap of air, and thus removing obstruction to the evacuation of the bowl, and at the same time, by creating a partial vacuum in the tank-trap, which is in fact a siphon, drawing the water from the tank into the flushing-pipe, whence it enters the bowl. Sometimes it is not desirable to produce simultaneously the two operations of withdrawing the air contained in the trap between the waste-pipe and bowl and that contained in the tank-siphon, but rather to produce the last-named operation first, thereby causing the bowl to be supplied with the flushing-water in a considerable quantity before the air-obstruction in the waste-pipe trap is removed.

The object of my present invention is to provide an improved construction of the flushing apparatus whereby the two operations referred to may be produced successively in the order stated.

In the accompanying drawings, Figure 1 is a view of my improved apparatus in elevation, partly sectional and broken; and Fig. 2, a broken sectional view showing an improved form of coupling desirable for connecting together the valve-pipe, tank-siphon shell, and flushing-pipe, details of the preferred form of my improved apparatus.

A is the bowl, communicating with the outlet-pipe B through the traps $r$ and $r'$.

C is the overhead tank filled from the pipe $q$, leading into it from the source of supply, and which may be controlled for the usual purpose and in the usual manner by a suitable float-valve device D.

E is a cap of peculiar construction secured in rigid position at the upper side of the tank C. The cap has a lateral threaded opening $p$, and may be threaded around the opening of its under side, preferably around the interior thereof, as shown, and is further provided inside with a threaded central nipple $o$, formed at the inner end of the opening $p$. This construction of cap is very readily formed by casting and easy to finish, and it affords a convenient coupling for supporting the outer shell $n$, forming the short leg of a tank-siphon F, and connecting with the latter the priming-pipe G, both hereinafter described. The outer shell $n$ of the siphon F is coupled to the cap E, and thereby hangs inside the tank C, extending at its lower open end below the normal water-line of the tank.

H is the flushing-pipe extending upward into the tank C and into the shell $n$, but short of the top of the latter, and communicating at its lower end with the bowl A. The flushing-pipe should be provided with a trap $r^2$, which may be, and preferably is, located, as indicated, near its lower end, or may be near its upper end, as illustrated in my said patent. The pipe G extends upward into the overhead tank, and is therein connected, as by the narrower branch pipe m, with the shell n, by coupling the pipe m with the cap E at its opening p, and the pipe m is led some distance down into the pipe H, from the upper end of the latter, by an extension-pipe m', coupled to the nipple o in the cap. Thus the pipe G leads, to all intents and purposes, directly into the upper end of the flushing-pipe and forms with the latter and the shell n the tank-siphon F. The lower end of the pipe G, provided with a suitable shut-off valve l, may lead to any desired point, even to the open air, though preferably into the bowl A, as represented, and inside the tank, below the water-line therein, the pipe G is provided with an inlet-opening x.

I is the air-pipe leading from the trap r into the tank and therein bent, as shown, and led from the bend v down into the lower end of the shell n, into which it extends upward a short distance. At the bend v, I extend from the air-pipe downward in the tank below the water-line therein a branch pipe k, which should be provided with a vent-aperture $x'$. The cap E should also be vented, as shown at $x^2$.

The operation is as follows: The valve l being normally closed, the pipe G normally contains water, which enters it through the aperture x. On opening the valve l the discharge of the water from its pipe draws after it the air contained in the pipe H, as also that in the shell n, creating sufficient of a vacuum therein to raise water from the tank to the inlet end of the flushing-pipe H, through which it runs into the bowl until the water-line in the tank falls below the lower end of the shell n. While flushing-water is thus being introduced into the bowl the coursing of the water through the shell n also draws air from the pipe I, thereby relieving the trap r and permitting the contents of the bowl to discharge freely into the outlet-pipe B. As soon as the water in the tank has fallen below the level of the aperture $x'$ in the branch pipe k it takes air through its aperture and thence introduces air again into the trap r, thereby stopping discharge from the bowl, which then receives the desired after-fill supply (owing to the vent $x'$ being higher than the lower open end of the siphon F) by the continued running of water from the tank into the pipe H until the supply in the tank falls below the lower end of the shell n.

The refilling of the tank, as will be understood, is produced automatically in the usual manner under the control of the float-valve device D.

My stated object, which is thus effected, may also be accomplished by omitting entirely the pipe G (when, of course, there would be no opening p in the upper end of the siphon F) and substituting for it the bent pipe G', (indicated by dotted lines,) normally submerged in the tank C and leading into the pipe H, being normally closed at its outer end, which extends upward to afford a valve-seat by a weighty valve l', controlled through the medium of a chain $l^2$, or the like, extending to a point of ready access for the operator to permit the valve to be raised and lowered with reference to its seat.

Though the construction first described is preferred, it will be seen that by manipulating the chain $l^2$ to raise the valve l', water from the tank will enter the pipe H through the pipe G' and create the desired vacuum in the siphon F, thereby producing the same result as with the use of the pipe G and its extensions m and m'. If the valve l' be raised only long enough to create a flow through the pipe H sufficient to form the desired vacuum in the siphon F, the operation will, obviously, continue until the siphon takes air at its open base.

What I claim as new, and desire to secure by Letters Patent, is—

1. In a water-closet-flushing apparatus, the combination, with the bowl A, outlet-pipe B, provided with traps r and r', and tank C, of a flushing-pipe H, leading from the bowl into the tank above the water-line therein and trapped in the tank to form a siphon, a vented air-pipe I, leading from the trap r and terminating in the lower part of a short leg of the tank-siphon, and means, substantially as described, operating to withdraw air first from the tank-siphon and afterward from the trap r, substantially as and for the purpose set forth.

2. In a water-closet-flushing apparatus, the combination, with the bowl A, outlet-pipe B, provided with traps r and r', and tanks C, of a flushing-pipe H, leading from the bowl into the tank above the water-line therein and trapped in the tank to form a siphon, a vented air-pipe I, leading from the trap r and terminating in the lower part of the short leg of the tank-siphon, and a priming-pipe provided with a valve and communicating in the tank with the water-supply and with the tank-siphon, substantially as and for the purpose set forth.

3. In a water-closet-flushing apparatus, the combination, with the bowl A, outlet-pipe B, provided with traps r and r', and tank C, of a flushing-pipe H, having a trap $r^2$ and leading from the bowl into the tank above the water-line therein and trapped in the tank to form a siphon, an air-pipe I, leading from the trap r into the lower part of the tank-siphon and vented in the tank below said water-line, and a priming-pipe G, having an opening x and communicating with the upper portion of the tank-siphon and extending thence outside the tank, substantially as and for the purpose set forth.

4. In a water-closet-flushing apparatus, the combination, with the bowl A, outlet-pipe B, provided with traps r and r', and tank C, of a cap E, rigidly supported in the tank and provided with a threaded lateral opening p and an internal nipple o, a shell n, fastened at one end to the cap and extending at its opposite end below the water-line in the tank, a flushing-pipe H, leading from the bowl upward into the shell n beyond the said water-line, an air-pipe I, leading from the trap r into the shell n near its base and vented in the tank below the said water-line, a priming-pipe G, leading upward into the tank and provided therein with an aperture x, a branch pipe m, connecting the pipe G from its upper end with the cap E at its opening p, and an extension m' of the branch pipe, secured at its upper end to the nipple o and projecting at its lower end into the pipe H, substantially as and for the purpose set forth.

5. In a water-closet-flushing apparatus, the combination, with the bowl A, outlet-pipe B, provided with traps r and r', and tank C, of a flushing-pipe H, having a trap $r^2$ and leading from the bowl into the tank above the water-line therein, a shell n, open at its base and supported in the tank to extend downward over the pipe H below the said water-line, an air-pipe I, leading from the trap r into the tank and bent therein to extend into the shell n near its base, a branch k at the bend of the air-pipe, extending downward in the tank below the water-line and provided with an aperture x', a priming-pipe G, leading upward into the tank and provided therein with an aperture x, and a branch pipe m, connecting the pipe G from its upper end with the shell n, and having an extension m' leading downward into the flushing-pipe H, the whole being constructed and arranged to operate substantially as described.

JOHN KELLY.

In presence of—
J. W. DYRENFORTH,
M. J. FROST.